(12) United States Patent
Tripathi et al.

(10) Patent No.: US 7,330,484 B2
(45) Date of Patent: Feb. 12, 2008

(54) METHOD AND SYSTEM FOR TRANSMITTING PACKET CHAINS

(75) Inventors: Sunay Tripathi, San Jose, CA (US); Cahya A. Masputra, Millbrae, CA (US); Bruce W. Curtis, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 867 days.

(21) Appl. No.: 10/683,762

(22) Filed: Oct. 10, 2003

(65) Prior Publication Data

US 2005/0122993 A1 Jun. 9, 2005

Related U.S. Application Data

(60) Provisional application No. 60/465,147, filed on Apr. 23, 2003.

(51) Int. Cl.
*H04J 3/16* (2006.01)
*H04J 4/24* (2006.01)

(52) U.S. Cl. ........................... 370/469; 370/474
(58) Field of Classification Search ............ None
See application file for complete search history.

(56) References Cited

U.S. PATENT DOCUMENTS

| | | | | |
|---|---|---|---|---|
| 5,764,972 A | * | 6/1998 | Crouse et al. | 707/1 |
| 6,792,559 B1 | * | 9/2004 | Cohen et al. | 714/15 |
| 6,816,562 B2 | * | 11/2004 | Atkinson et al. | 326/39 |
| 6,839,242 B2 | * | 1/2005 | Forinash et al. | 361/760 |
| 6,912,217 B1 | * | 6/2005 | Vogel | 370/389 |
| 7,103,008 B2 | * | 9/2006 | Greenblat et al. | 370/258 |
| 7,167,927 B2 | * | 1/2007 | Philbrick et al. | 709/250 |
| 2002/0010805 A1 | * | 1/2002 | Hyder et al. | 709/321 |
| 2002/0167910 A1 | * | 11/2002 | Gammenthaler, Jr. | 370/252 |

* cited by examiner

*Primary Examiner*—Andrew C. Lee
(74) *Attorney, Agent, or Firm*—Martine Penilla & Gencarella, LLP (57) ABSTRACT

Embodiments of the present invention are directed to a method and system for processing data to be transmitted in a transmission medium, including storing in memory a segment of data to be transmitted where the segment of data is larger than the largest size data packet allowed for transmission by the transmission medium. A socket layer batch processes the segment to produce an array of linked data blocks where each data block is smaller than the largest transmission size of the TCP layer. A TCP layer batch processes the array to add a first header to each block of the array of linked data blocks. An IP layer batch processes the array to add a second header to each block of the array of linked data blocks. The socket layer then identifies blocks of the array to a communication subsystem for individual packet communication over the transmission medium.

33 Claims, 8 Drawing Sheets

100

```
┌─────────────────────┐
│ 100                 │
│ START PROCESS       │
└──────────┬──────────┘
           ▼
┌─────────────────────────────────────────┐
│ 110                                     │
│ STORE IN MEMORY A SEGMENT OF DATA TO BE │
│ TRANSMITTED                             │
└──────────────────┬──────────────────────┘
                   ▼
┌─────────────────────────────────────────┐
│ 120                                     │
│ SOCKET LAYER ACTS TO PROCESS SEGMENT TO │
│ PRODUCE AN ARRAY OF LINKED DATA BLOCKS  │
└──────────────────┬──────────────────────┘
                   ▼
┌──────────────────────────────────────────────┐
│ 130                                          │
│ TCP LAYER USES A BATCH PROCESS TO ADD A FIRST│
│ HEADER TO EACH BLOCK OF ARRAY OF LINKED DATA │
│ BLOCKS                                       │
└──────────────────┬───────────────────────────┘
                   ▼
┌──────────────────────────────────────────────┐
│ 140                                          │
│ IP LAYER USES A BATCH PROCESS TO ADD SECOND  │
│ HEADER TO EACH BLOCK OF ARRAY OF LINKED DATA │
│ BLOCKS                                       │
└──────────────────┬───────────────────────────┘
                   ▼
┌────────────────────────────────────────────────┐
│ 150                                            │
│ IP LAYER TO IDENTIFY BLOCKS IN ARRAY TO        │
│ COMMUNICATION SUBSYSTEM FOR COMMUNICATION      │
│ OVER TRANSMISSION MEDIUM                       │
└──────────────────┬─────────────────────────────┘
                   ▼
┌─────────────────────────────────────────┐
│ 160                                     │
│ NIC COMMUNICATES OVER TRANSMISSION      │
│ MEDIUM ONE PACKET AT A TIME             │
└──────────────────┬──────────────────────┘
                   ▼
┌─────────────────────┐
│ 199                 │
│ END PROCESS         │
└─────────────────────┘
```

METHOD AND SYSTEM FOR TRANSMITTING PACKET CHAINS

RELATED APPLICATIONS

This application claims priority to the U.S. Provisional Patent Application No. 60/465,147 entitled "Vertical Perimeter Protection Mechanism" by Sunay Tripathi, filed Apr. 23, 2003 and is also incorporated herein by reference.

U.S. patent application Ser. No. 10/683,933, entitled "A System And Method For Vertical Perimeter Protection" by Sunay Tripathi and Bruce Curtis, filed Oct. 10, 2003, is incorporated herein by reference.

U.S. patent application Ser. No. 10/683,720, entitled "Multi-Threaded Accept Mechanism In A Vertical Perimeter Communication Environment" by Sunay Tripathi, filed Oct. 10, 2003, is incorporated herein by reference.

U.S. patent application Ser. No. 10/683,897, entitled "A Method And System For Processing Communications Packets According To Event Lists" by Sunay Tripathi and E. Nordmark, filed Oct. 10, 2003, is incorporated herein by reference.

U.S. patent application Ser. No. 10/683,959, entitled "Running A Communication Protocol State Machine Through A Packet Classifier" by Sunay Tripathi and Bruce Curtis, filed Oct. 10, 2003, is incorporated herein by reference.

U.S. patent application Ser. No. 10/683,934, entitled "A Method For Batch Processing Received Message Packets" by Sunay Tripathi and S. Kamatala, filed Oct. 10, 2003, is incorporated herein by reference.

BACKGROUND

Modern networking describes the ability of electronic devices to communicate with other devices. Some authorities, in fact, define networking in terms of communication between nodes.

Modern networks generally communicate via a set of protocols, one of these being TCP/IP, which stands for Transmission Control Protocol/Internet Protocol. TCP/IP is a suite of communication protocols used to connect hosts on the Internet. TCP/IP uses several protocols, the two main ones, of course, being TCP and IP. TCP/IP is the de facto standard for transmitting data over many networks including the open Internet. Network operating systems that have their own proprietary protocols also support TCP/IP enabling communication between different systems.

TCP is, as stated above, an abbreviation of Transmission Control Protocol. TCP enables two hosts to establish a connection and exchange streams of data. Generally, TCP guarantees delivery of data and also guarantees that packets will be delivered in the same order in which they were sent.

IP, as noted above, is an abbreviation of Internet Protocol. IP specifies the format of packets and the addressing scheme. Most networks combine IP with Transmission Control Protocol (TCP), which establishes a virtual connection between a destination and a source.

IP allows a packet to be addressed and then it can be dropped in the system, but generally there is no direct link between the sender and the recipient. TCP/IP, the combination of TCP and IP, establishes a connection between two hosts so that they can send messages back and forth for a period of time and addresses packets so that they may be sent between the hosts established by TCP.

In some operating systems, a packet is identified only as a set of locations, or data offsets, of data stored in a medium. A packet is identified as a small block of information, or message block, which can be called an "mblk." An mblk contains pointers to identify the start and end of a set of information which can include a packet header, packet payload, or a combination of header and payload.

Currently, when messages are to be sent in packetized form, an operating system identifies and creates one mblk at a time and sends each one to the TCP layer to be transmitted. For a large set of data, an mblk is created for each approximately 1460 byte data segment to be packetized and is sent to TCP which processes the mblk and either sends it to the IP layer or queues it onto the transmit list, depending on the amount of transmitted traffic and congestion in the available transmission channels. Once the TCP layer returns a message indicating handling in one of those ways, the sender creates the next mblk for the next data segment and sends it to TCP. The process continues until the entire message has been sent.

According to the transmission procedure, the socket layer, the TCP layer, then an IP layer, then the network interface card (NIC), handle each packet in turn until the data segment is done. While modern processing has made the individual packets move very quickly through this procedure, it can be an inefficient process when handling large messages requiring multiple packets.

SUMMARY

Accordingly, a method and system are presented which enable the handling and transmission of packets in chains. Embodiments of the present invention enable an operating system to inform a TCP layer of the relationship between packets thereby allowing the socket layer, the TCP layer and the IP layer to batch process the chained packets.

Specifically, Embodiments of the present invention are directed to a method and system for processing data to be transmitted in a transmission medium including, storing in memory a segment of data to be transmitted where the segment of data is larger than the largest-size data packet allowed for transmission by the transmission medium. A socket layer processes the segment to produce an array of linked data blocks wherein each data block is smaller than the largest size. The TCP is passed a pointer to the array and it adds a first header to each block of the array of linked data blocks. Similarly, the IP layer is passed the array pointer and it adds a second header to each block of the array of linked data blocks. The IP layer also identifies blocks of the array to a communication subsystem for communication over the transmission medium. Communication efficiency is increased via the batch processing available to the socket, TCP and IP layers which can batch process the linked or chained data blocks.

Therefore, embodiments of the present invention disclose an optimal way for an operating system to send data. Embodiments enable data packetization using "mblk" (message-block) chains in which each mblk represents a maximum TCP segment size. When large files need to be transmitted, a chain can be restricted to contain data from one web page for instance. In one embodiment, the sender can pre-allocate space in each mblk for TCP/IP headers and individual mblk links.

In one embodiment, the packet headers are written by TCP/IP but the space can be allocated by the sending application or by the socket layer. The packets are processed as a chain through TCP, through the IP layer and to the network interface card (NIC), provided that the NIC can directly handle the chain. Alternatively, the IP layer can also split the chain into individual mblks and send each individually to the NIC for those NICs that cannot directly handle a chain of packets. Either way, the number of transmission instructions executed per packet is reduced by batch processing the packets as chains.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The operation and embodiments of this invention can be best visualized by reference to the drawings.

DETAILED DESCRIPTION

Reference will now be made in detail to embodiments of the invention, examples of which are illustrated in the accompanying drawings. While the invention will be described in conjunction with the embodiments thereof, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, the present invention may be practiced without these specific details. In other instances, well-known methods, procedures, and components have not been described in detail so as not to unnecessarily obscure aspects of the present invention. At times, concepts disclosed in this discussion of embodiments of the present invention will be made more readily apparent be reference to the Figures.

Embodiments of the present invention are presented which enable the handling and transmission of data blocks in chains, where each data block represents a packet to be transmitted. Embodiments enable data being sent through network communications media to be sent more efficiently by batch processing of the chained packets through the communication software layers. Embodiments enable an operating system to inform a TCP layer of the relationship between chained packets and to batch process the addressing headers to each packet. Also, the IP layer can also batch process the linked packets for generating the IP headers.

Specifically, embodiments of the present invention are directed to a method and system for processing data to be transmitted in a transmission medium including, storing in memory a segment of data to be transmitted where the segment of data is larger than the largest-size data packet allowed for transmission by the transmission medium. A socket layer is allowed to process the segment to produce an array of linked data blocks where each data block is smaller than the largest size data packet, A TCP layer then adds a first header to each block of the array of linked data blocks in a batch process. An IP layer then adds a second header to each block of the array of linked data blocks using a batch process. The socket layer then identifies blocks of the array to a communication subsystem for communication over the transmission medium. In one embodiment, Ethernet communication is used.

Figure 1:
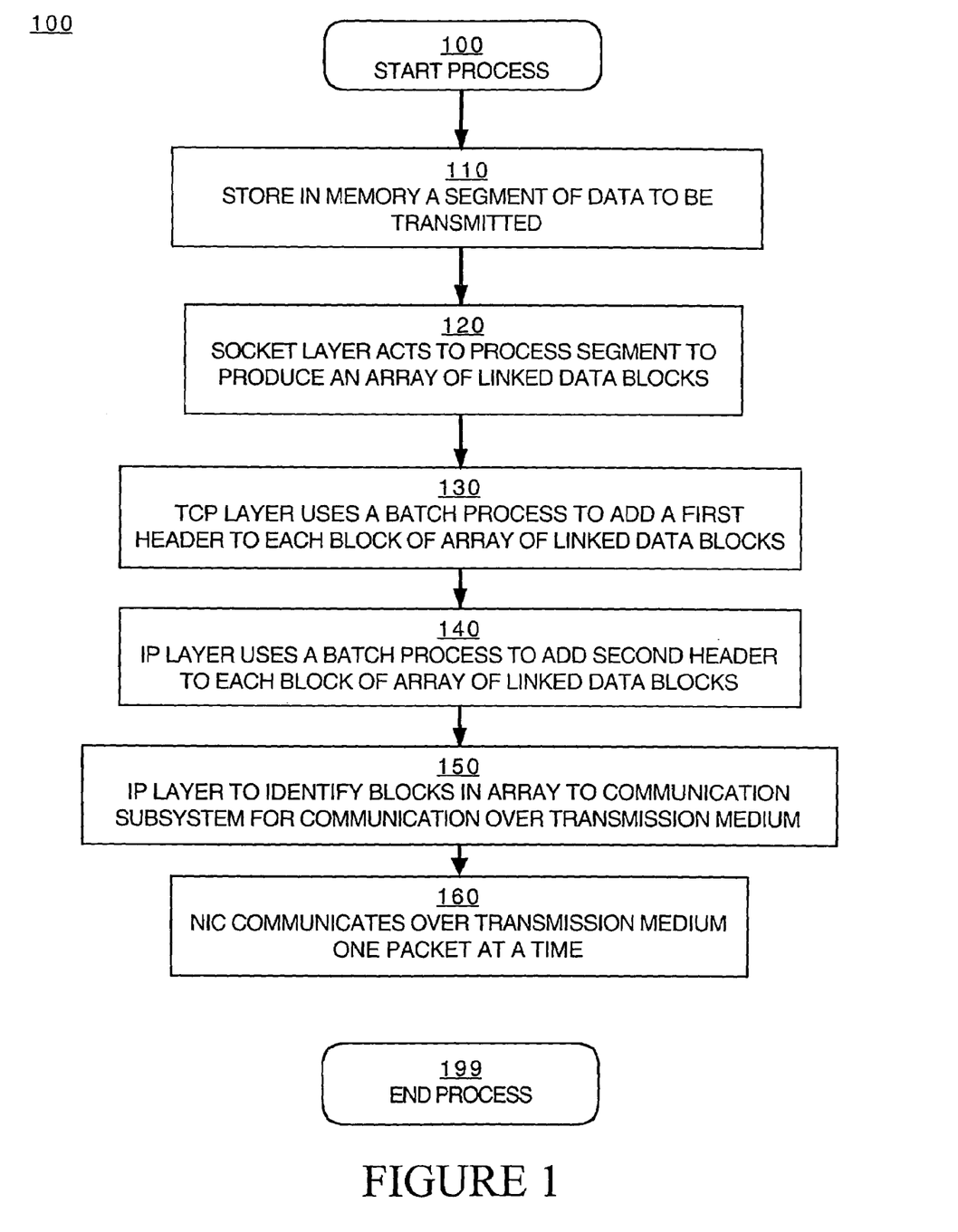
FIG. 1 illustrates a flow diagram of a computer implemented method for transmitting packet chains in a network in accordance with an embodiment of the present invention.

FIG. 1 is a flow diagram illustrating a computer implemented process by which packet transmissions are made in a network in accordance with embodiments of the present invention. Process 100 commences at step 110 with an application layer storing in memory a data segment to be transmitted. Data to be transmitted can be any form of electronic data, such as stored text, graphics, program instructions, and the like. Any information that is storable in an electronic form is transmittable in a network environment. Once the data segment is stored in memory, a pointer to the data segment is then passed to a socket layer of the communication protocol. At this point, the application layer can go on with other tasks and does not need to revisit the communication of the data segment.

At step 120, the data to be transmitted is processed by the socket layer to produce an array of linked data blocks. Data that is to be transmitted is identified in discrete portions, or blocks, of up to 1460 bytes each in one embodiment. It is appreciated that this block size is exemplary only and represents the typical data packet size used by TCP communication. It is appreciated that this block size will vary depending on the communication medium selected. If there is less than 1460 bytes to transmit, only one block is identified. If there are more than 1460 bytes of data, more than one block is identified. In one embodiment of the present invention, the linking of related data blocks is established by a common destination designation. In another embodiment, the linking is established by association with the common data segment.

It is noted that, in many operating systems, data is not actually copied or moved when it is identified from one software layer to another. The identification of data involves identifying its stored location, whether as a memory address or an offset. In other words, at step 110, the identity of the location of the data segment and its intended recipient are communicated to the socket layer by the application desiring the transmission. Later, the socket layer informs the TCP layer of the data array location and destination at step 120.

At step 130, the TCP layer uses the pointer to the array to identify the data blocks of the array and writes a TCP header in each data block to be sent. A TCP header, it is noted, generally comprises twenty bytes, or 160 bits, of data which includes a source port number, a destination port, which is actually an application to which the packet is to be sent, a checksum, and a sequence number, among other information. The TCP headers are added to the data blocks in a batch operation, e.g., in a single pass during a common process. Embodiments of the present invention are enabled to associate the TCP header, comprising very similar information, with the exception of a sequence number, with each of the linked data blocks in the array. In this way, the work of the TCP layer is reduced to changing the sequence number in each TCP header and not having to write a new header for each data block. Because the TCP layer is aware of the data array, and not merely a single data block, efficient procedures can be applied to the data blocks for constructing the TCP headers therein. At the end of step 130, the TCP layer passes a pointer to the array of the IP layer for further processing.

At step 140, process 100 adds a second header to each data block in the array, again using a batch process. This is performed by the IP (Internet Protocol) layer which writes an IP header into each data block of the array. An IP header comprises, among other information, a source IP address, a destination IP address, a total length of the packet including headers and data, and a checksum, among other information. Because all the linked data blocks have similar information, other than total length, the header can be copied for each of the linked data blocks, with the exception of total length which can differ from header to header. Similar to the TCP case, because the IP layer is a aware of the entire array, and not just one data block, efficient processes can be used for adding the IP headers to the individual blocks of the array.

At step 150, the linked data blocks, which are each now packetized with a TCP header and an IP header, are identified to the appropriate communication subsystem. The packets of the array can be identified to the NIC one packet at a time, a group of packets at a time (e.g., a message), or an entire array at a time. The difference being based on the NIC's capabilities. In one embodiment, the communication subsystem is a network interface card (NIC). In other embodiments, the communication interface can be by other means.

In an embodiment of the present invention employing a network interface card (NIC), the NIC is the mechanism by which the packets are actually transmitted to the network. In some implementations of embodiments of the present invention, a NIC can be of a type capable of handling a linked chain of data packets. In other implementations, though, the NIC may process a linked chain of packets one at a time. In other words, the NIC is supplied with packets only one at a time due to its capabilities. However, the processing and writing of packet headers prior to the NIC involvement is made more efficient by batch processing a chain of packets together, rather than processing each packet individually.

At step 160, the NIC communicates the data packets of the array one packet at a time over the communication medium, e.g., wired or wireless network, Ethernet, Internet, etc. It is appreciated that whether the NIC is passed the data packets, e.g., from the IP layer, one packet at a time, a group of packets at once, or the entire array at once, it still transmits the packets one at a time over the communication medium.

At step 199, process 100 ends. Process 100 is completed for each data segment that is to be transmitted. If a data segment is less than 1460 bytes in length, then only one data block is created at step 120.

Figure 2:
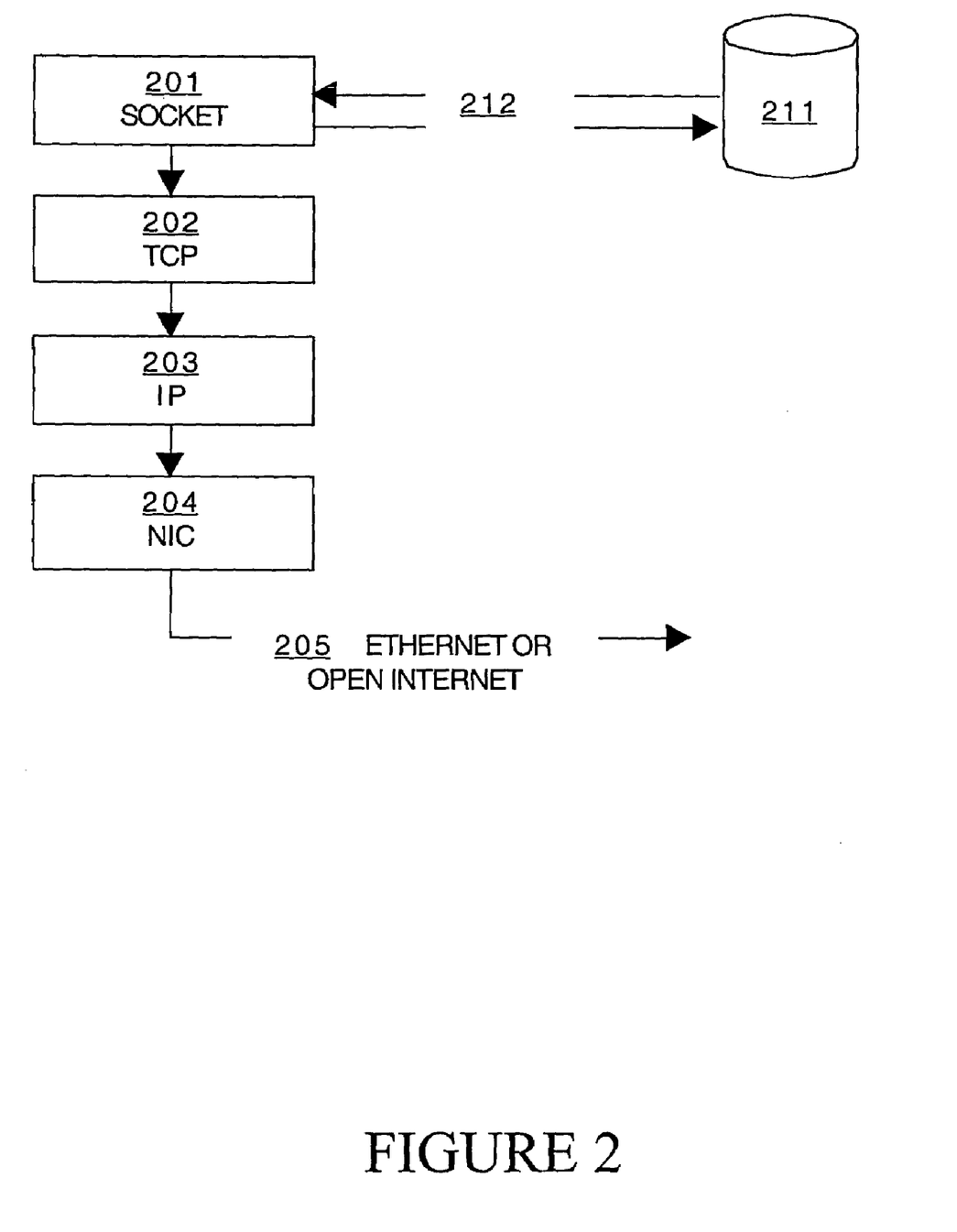
FIG. 2 illustrates a data flow diagram of transmission of a packet in accordance with an embodiment of the present invention.

FIG. 2 is a block diagram of the handling of a data segment to be transmitted. When an application 212 needs to transmit data stored in a medium, such as hard disk or memory 211 for example, to some other location, it tasks socket layer 201 to identify the location of the data, to create an array of linked data blocks, and to send the array location to the TCP layer. It is noted that a socket is one endpoint of a two-way communication link between two applications running on the network. In one embodiment, the socket layer performs the segmentation of the data segment into data blocks, links them together and identifies the location offset. These are then written to an array of message blocks (mblk) that is sent to the TCP layer as described above. In essence, the socket layer provides a link between the TCP layer and the data. It is noted again that the socket layer does not copy the data to be transmitted to the TCP layer but rather passes a pointer of the data array to the TCP layer.

TCP layer 202, as described earlier, writes a TCP header that includes a source and destination port and a sequence number, among other information. TCP assigns a respective header to each message block sent by the socket. In one embodiment of the present invention, TCP layer 202 assigns a similar header to each data block in the linked chain, with the exception of a sequence number which changes for each data block of the array.

It is noted here that a typical TCP layer is required to perform its "bookkeeping," meaning determining what ports to assign to each block and tracking its progress between ports, for each block separately. Embodiments of the present invention, however, reduce the computational load for a TCP layer. Each header that attaches to data blocks that are all headed to the same destination can be very similar except for the sequence number discussed above, thereby saving processing time.

One embodiment of the present invention can implement header attachment by packetizing chains of data blocks through the use of mblk chains. In an mblk chain, mblks are linked with a field in the mblk which is labeled "b_next" and a field called "b_cont."

Referring again to FIG. 2, after TCP layer 202 writes and associates its headers to each block in the mblk chain, the chain or "array" is sent to the IP layer 203 for ultimately sending to the network. IP layer 203 applies its headers in the same batch processing fashion as the TCP layer 202. An IP header, which comprises source and destination IP addresses as well as other information, is attached to each mblk and each contains identical source and destination IP addresses and similar total length information. After the IP headers are added, the chain of mblks is sent to the network interface card (NIC) 204 or other interface device for physical delivery to the network.

Figure 3A:
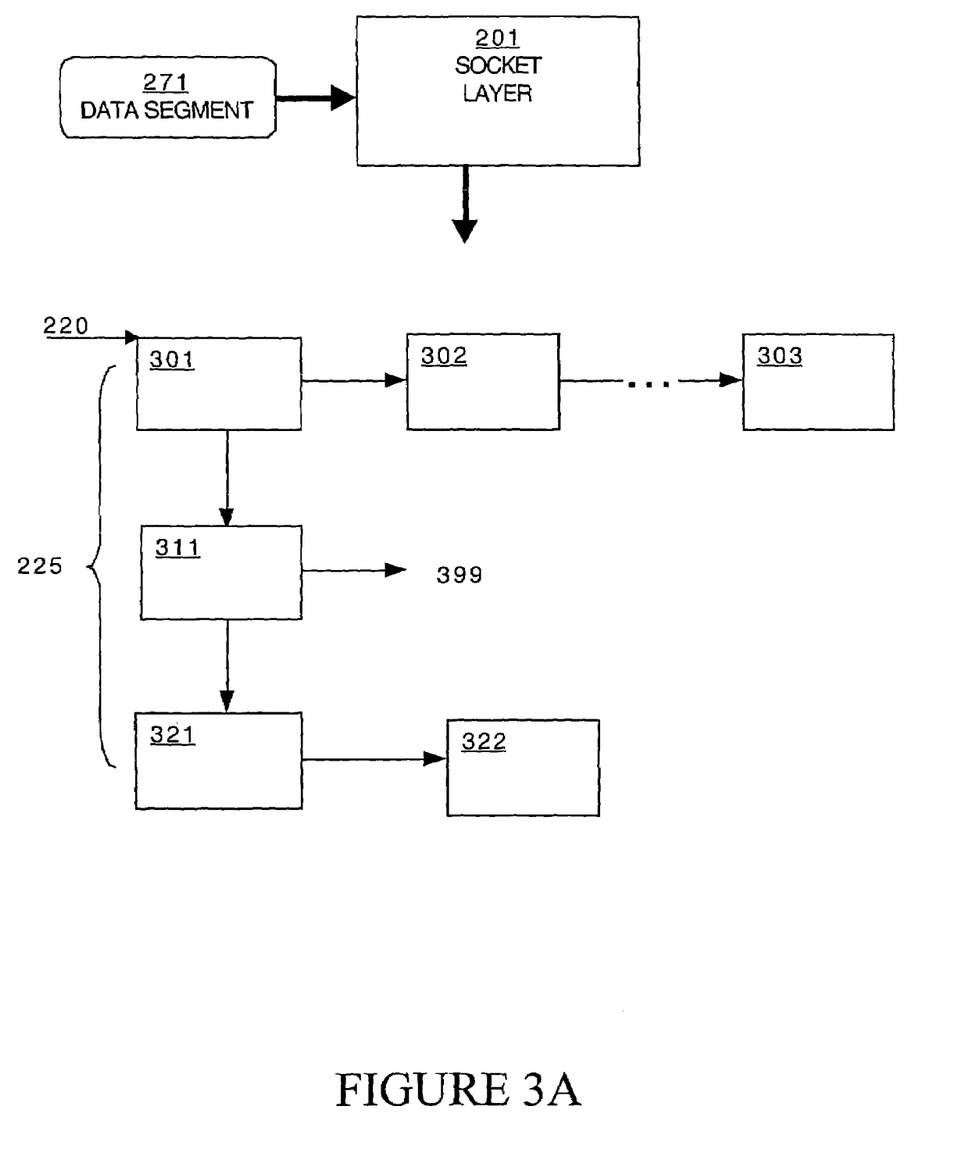
FIG. 3A is a block diagram of a data segment to be transmitted separated into an array of linked or chained data blocks in accordance with an embodiment of the present invention.

FIG. 3A illustrates the data segment 271 stored by the application layer being divided into linked data blocks 301-322. An array pointer 220 identifies the array 225 in memory. As further discussed below, the links that traverse horizontally are called b_cont links and the vertically traversing links are called b_next links. The array 225 is divided in this format so that separate objects, e.g., "messages," can be assigned to an array row with objects being linked by b_next pointers. Each link is a memory address or offset pointer.

Figure 3B:
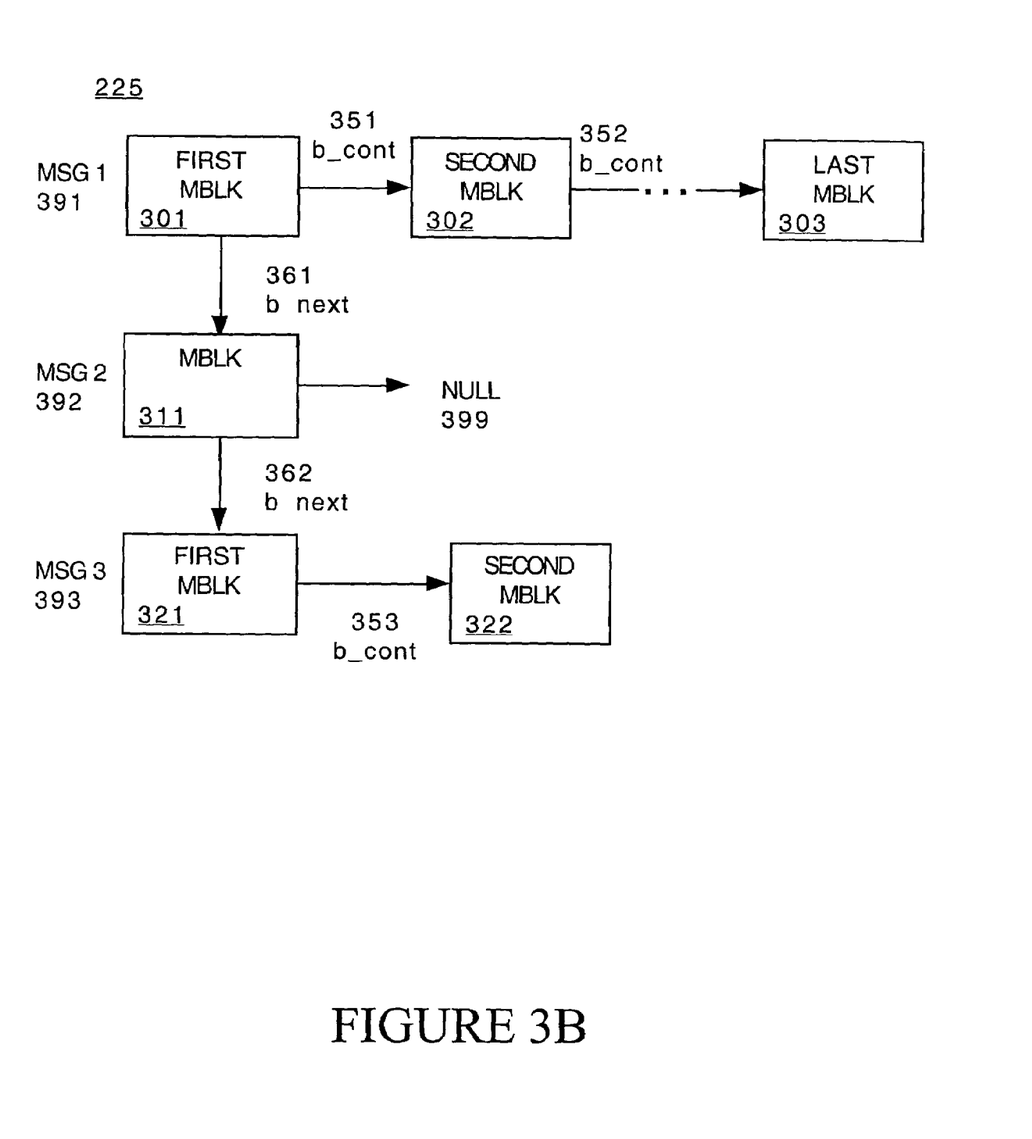
FIG. 3B illustrates a logical diagram of a chain of packets in transmission in accordance with an embodiment of the present invention.

FIG. 3B illustrates an array 225 including a sequence of messages for transmission in accordance with embodiments of the present invention. The first message to be sent is logically segmented into blocks, as described above, and first mblk 301 is written to describe the first data block. Included in mblk 301 is a pointer in mblk field "b_cont" 351. The pointer at b_cont points to the second mblk 302 associated with the first message. Each mblk in turn, in addition to its other functions, points to the next successive mblk if one exists. At the last mblk 303, no pointer exists in the b_cont field. It is noted that embodiments of the present invention may label the fields in the message block with other names than those used but they function to point to the next message block.

It is also noted that each mblk describes a block of data which resides in a storage medium, whether that is a volatile memory or long term memory or some other medium. The data block is described by a pointer to the location of the data, or to another pointer. The pointer can be an absolute address or an offset. The data is also described by a field that either indicates the size of the data block or a pointer to an end point in the data. It is again noted that a maximum length for a data packet in current network transmission is 1500 bytes and that includes each of the two headers, the TCP header and the IP header, which require 20 bytes each. Therefore, each data block is limited to a maximum of 1460 bytes in one embodiment. A small message, or the last data block in a message which comprises multiple data blocks, can comprise a data block smaller than 1460 bytes.

When there are more than one message or data stream intended for the same destination, as shown in FIG. 3B, embodiments of the present invention are enabled to link data blocks from the additional messages. In FIG. 3B, this is illustrated by the linking, through mblk data field "b_next" 361 of mblk 311 to mblk chain 301-303. A pointer in the b_next field of mblk 311 can point to another mblk 321. In one embodiment, an application can write multiple messages to the socket layer by means of a "writev" or a "sendfilev" system call.

In the example illustrated in FIG. 3B, the second message 392 is small enough that only one mblk is needed to describe it. For that reason, the b_cont field of mblk 311 contains null pointer 399 and no following mblks are pointed to in that message.

Referring still to the example of FIG. 3B, the b_next field of mblk 311 contains a pointer to mblk 321 which is the first mblk representing the third message 393. The b_cont field of mblk 321 contains a pointer to mblk 322. Because mblk 321 represents the last message in the group being transmitted to a particular destination, the b_next field of mblk 321 contains a null pointer and no further message is referenced.

Figure 3C:
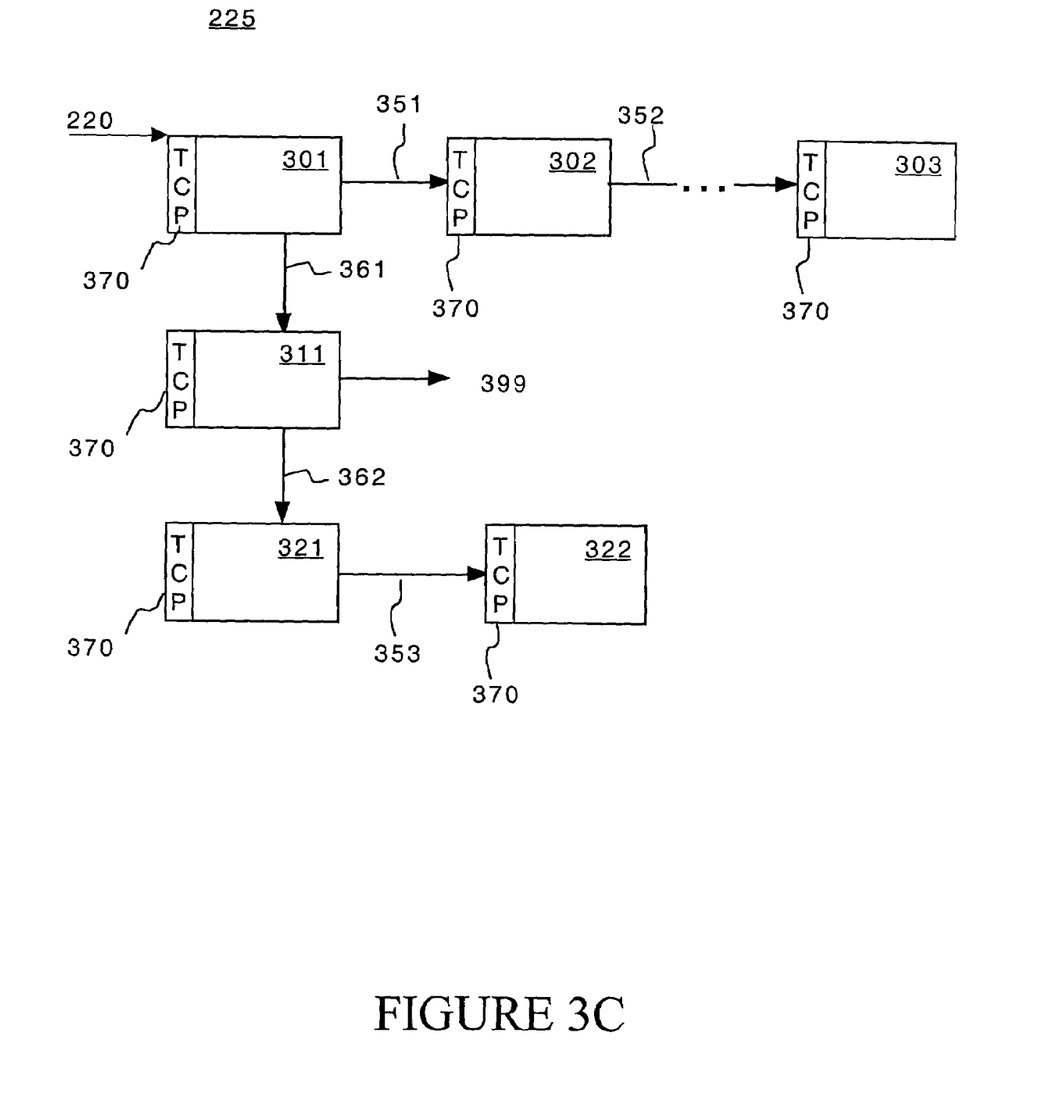
FIG. 3C illustrates the data block array after batch processing through the TCP layer in accordance with an embodiment of the present invention.

FIG. 3C illustrates the array 225 after being batch processed by the TCP layer 202. As shown, each of the linked data blocks 301-322 contains a respective TCP header 370 which may be made-up of very similar information. Because the TCP headers 370 are batch processed, the generation of TCP headers is done very efficiently by the TCP layer 202. As discussed above, the array 225 is identified in memory by a pointer 220.

Figure 3D:
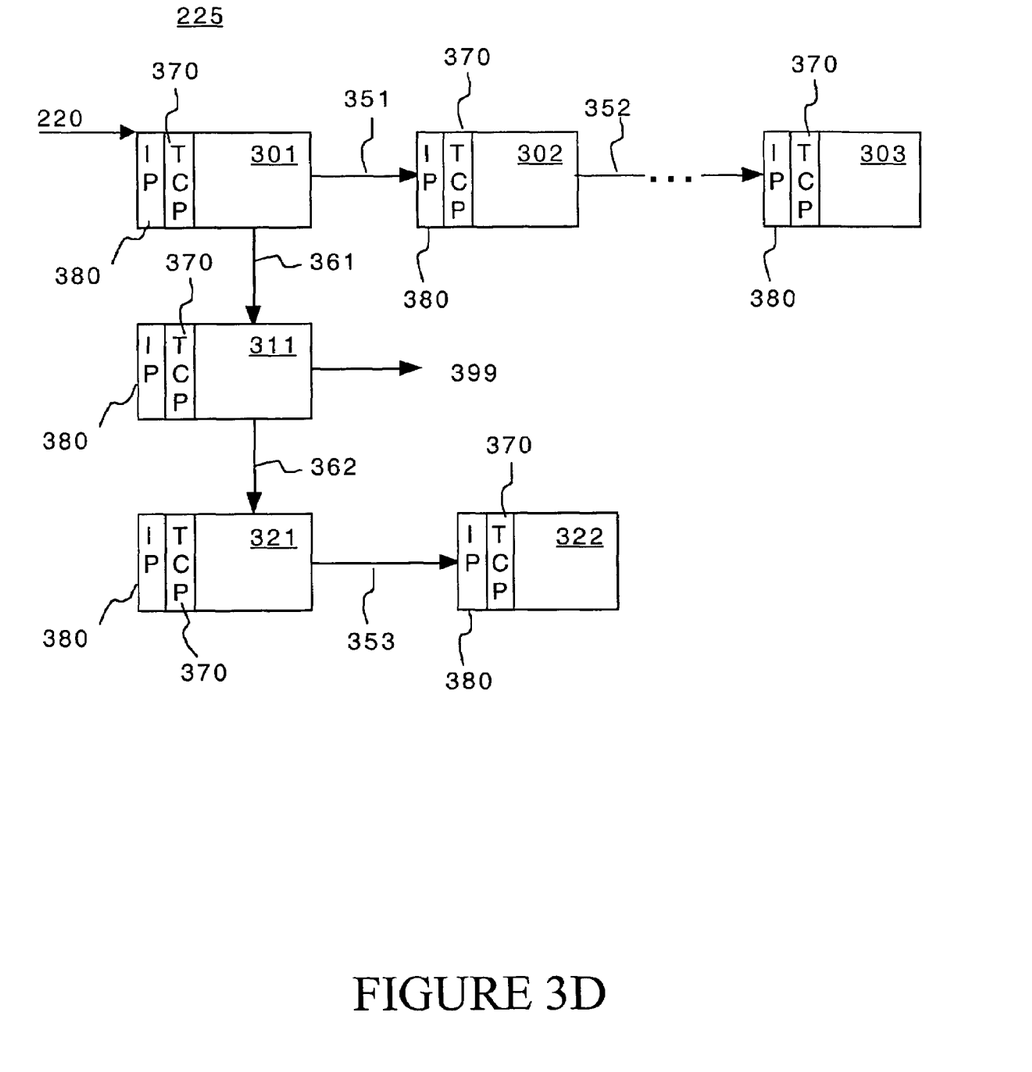
FIG. 3D illustrates the data block array after batch processing through the IP layer in accordance with an embodiment of the present invention.

FIG. 3D illustrates the array 225 after being batch processed by the IP layer 203. As shown, each of the linked data blocks 301-322 contains a respective IP header 380 which may be made-up of very similar information. Because the IP headers 380 are batch processed, the generation of IP headers is done very efficiently by the IP layer 203. Again, pointer 225 identifies the array to the IP layer. It is noted that FIG. 3D shows the TCP header 370 in an apparent position ahead of IP header 380 in relation to the payload body of each packet. However, the order of appearance of the headers is not material to embodiments of the present invention.

Figure 4:
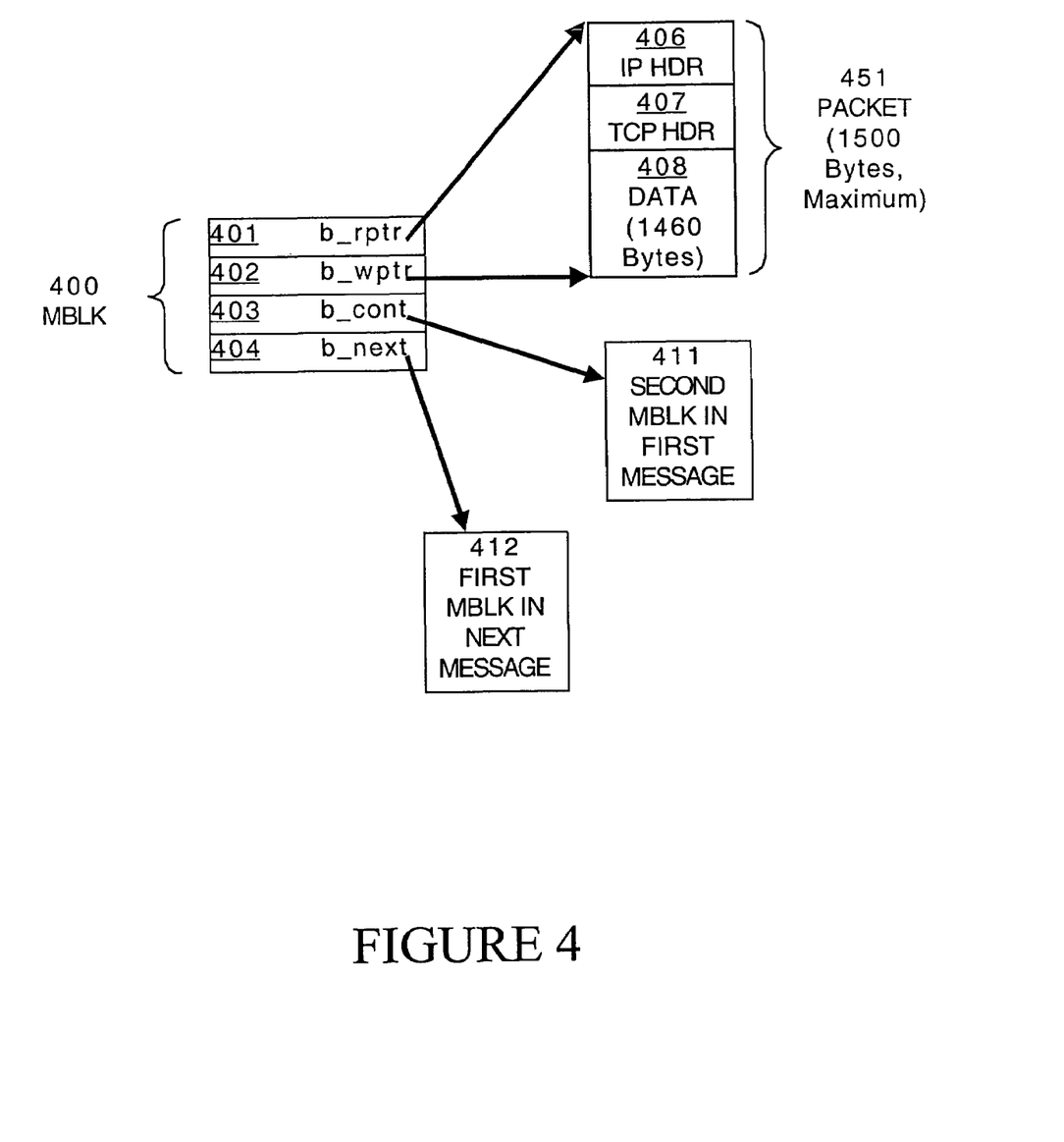
FIG. 4 illustrates the content of a typical data block and packet in accordance with an embodiment of the present invention.

FIG. 4 illustrates an exemplary data structure of a data block in accordance with an embodiment of the present invention. In one embodiment of the present invention, mblk 400 represents one data block of an array and comprises b_rptr field 401, b_wptr field 402, b_cont field 403 and b_next field 404. It is noted here that an mblk can have other data structures in other exemplary implementations.

As noted above, b_rptr 401 contains a pointer to the location of the start of the packet that is to be sent through the network. Field b_wptr 402 contains a pointer to the end of the data to be sent. It is noted here that, in another embodiment, b_wptr 402, or its equivalent, can contain a data block size indicator. To find a data end point in that implementation, the size indicator can be added to the start indicator.

Data field b_cont contains, when applicable, a pointer to a second, or next, mblk 411 in a chain of mblks describing set of data blocks that are all related to a same message. It is noted that a single message may comprise more or fewer bytes, when transmitted, than 1500 bytes, the maximum number transmittable in a single packet. It is noted again that, in one implementation, the TCP and IP headers, 406 and 407, each require 20 bytes, leaving a maximum of 1460 bytes for data.

Data field b_next 404, in this embodiment, contains a pointer to the first mblk 412 in another message. In one embodiment of the present invention, there is no limit to the number of mblks in a chain that can describe either a single message requiring multiple packets or a series of messages all intended for the same recipient.

An mblk that is pointed to by b_cont 403 or by b_next 404 comprises an additional and distinct set of four, or more, fields which are, a different set of b_rptr, b_wptr, b_cont and b_next pointers. As noted above, fields b_rptr and b_wptr describe data to be included in a packet and fields b_cont and b_next point to additional mblks as required. If there is no next mblk in the present message nor a next message, fields b_cont and b_next contain a null pointer. It is again noted that other embodiments may have more data fields in an mblk than are described here. Further, the names used here refer to the usage in one embodiment. Other embodiments may use different names for these fields without limitation to their functions.

Figure 5:
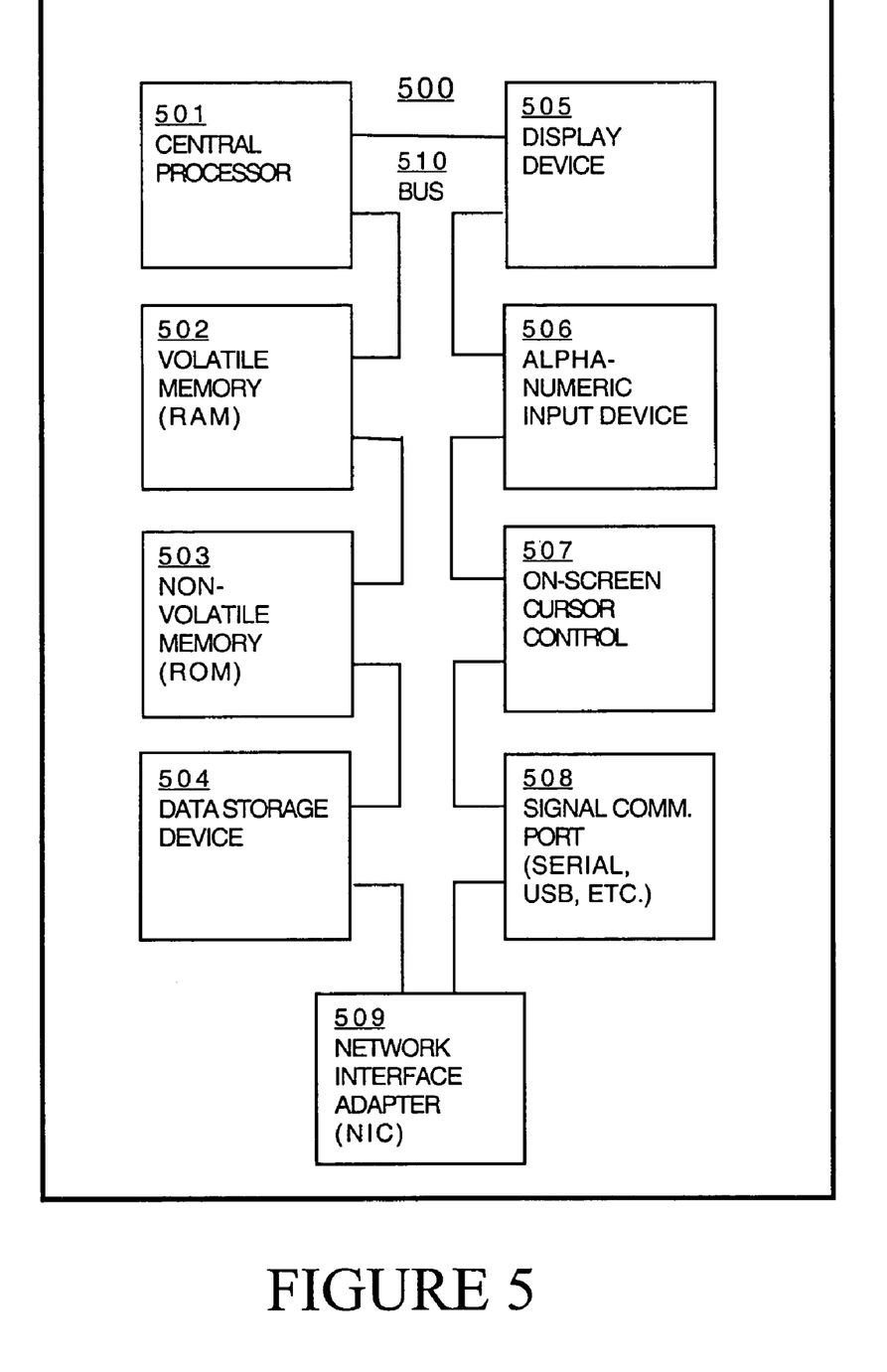
FIG. 5 is a block diagram of a generic computer in accordance with an embodiment of the present invention.

Embodiments of the present invention discussed here may be implemented as software programming code used by a computer similar to the generic computer illustrated in FIG. 5, in block diagram form. There, an exemplary server system 500 comprises bus 510 which electronically connects central processor 501, volatile random-access memory (RAM) 502, non-volatile read-only memory (ROM) 503 and data storage device 504. Optional display device 505 is also connected to the bus. Optional alpha-numeric input device 506, on-screen cursor control 507, and signal input/output (I/O) device 508 are similarly connected. Optional serial I/O device 508 could be implemented as an Ethernet link, a serial connection, USB, an infrared transceiver or an RF transceiver. In this embodiment of the present invention, device 508 is utilized to provide connection with a network and through it, the Internet. Data storage device 504 can be the repository for instructions implementing embodiments of the present invention.

Embodiments of the present invention communicate in networks. As discussed above, network interface adapter (NIC) 509 enables a computer system such as computer system 500 to transmit into and to receive from a network such as Ethernet or the open Internet.

It is noted that, though shown in this embodiment as constituents in a single entity, the elements of generic computer system 500 can be implemented in a number of ways in other embodiments. For example, data storage device 504 may include storage devices located in a different physical location from processor 501. Also, display device 505 can be implemented as a remote display, such as a cathode ray tube (CRT) display or a liquid crystal display (LCD) device. The physical implementation of any element is not meant to limit the functionality of any embodiment.

Embodiments of a novel method and system for efficiently transmitting packets in a packet data communication medium, such as Ethernet or the Internet, have been disclosed herein. Embodiments disclose an optimal way to send data packets by using existing commands to define a chain of packets which may link several messages. Headers for each linked packet are then generated and portions of each header are identical, making the generation of headers an efficient process.

The foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for processing data to be transmitted on a transmission medium, said method comprising:
    a) storing in memory a segment of data to be transmitted wherein said segment of data is larger than the largest size of a single data packet allowed for transmission by said transmission medium;
    b) processing said segment to produce an array of linked data blocks wherein each data block is smaller than said largest size wherein said b) is performed by a socket layer of a network communication protocol stack;
    c) adding a first header to each data block of said array of linked data blocks, wherein said c) is performed by a transmission control protocol (TCP) layer of the network communication protocol stack;
    d) adding a second header to each data block of said array of linked data blocks, wherein said d) is performed by an internet protocol (IP) layer of the network communication protocol stack, wherein operations c) and d) collectively serve to generate a separate packet for each data block in the array of linked data blocks, wherein the separate packets for the data blocks are linked to form a packet chain having a packet sequence corresponding to a linkage sequence of the data blocks in the array of linked data blocks; and
    e) identifying the packetized data blocks of said array to a communication subsystem for communication over said transmission medium.

2. A method as described in claim 1 wherein said transmission medium comprises a transmission protocol.

3. A method as described in claim 2 wherein said transmission protocol is a packetized protocol.

4. A method as described in claim 3 wherein said packetized protocol is TCP/IP.

5. A method as described in claim 1 wherein said communication subsystem is a network interface card (NIC).

6. A method as described in claim 5 wherein said e) comprises identifying said packetized data blocks of said array one data block at a time to said NIC and wherein said e) is performed by said IP layer of the network communication protocol stack.

7. A method as described in claim 6 further comprising said NIC accessing said one data block at a time and transmitting said one data block at a time as a data packet over said transmission medium.

8. A method as described in claim 5 wherein said e) comprises identifying at one time all of said packetized data blocks of said array to said NIC and wherein said e) is performed by said IP layer of the network communication protocol stack.

9. A method as described in claim 8 further comprising said NIC accessing said array and transmitting one data block at a time as a data packet over said transmission medium.

10. A method as described in claim 5 wherein said array comprises a plurality of linked messages wherein each message comprises a plurality of linked data blocks and wherein said e) comprises identifying one message at a time to said NIC and wherein said e) is performed by said IP layer of the network communication protocol stack.

11. A method as described in claim 10 further comprising said NIC accessing each message and transmitting one data block at a time as a data packet over said transmission medium.

12. A method as described in claim 5 further comprising said NIC transmitting each data block of said array over said transmission medium one data block at a time as a data packet over said transmission medium.

13. A method as described in claim 1 wherein said a) is performed by an application layer of the network communication protocol stack.

14. A method as described in claim 1 wherein said first header is a TCP header and wherein said second header is an IP header.

15. A method as described in claim 1 wherein each data block of said array is approximately 1,500 bytes in length.

16. A method as described in claim 1 wherein said data blocks of said array are linked by memory address pointers stored therein.

17. A method for processing data to be transmitted on a transmission medium, said method comprising:
    a) storing in memory a segment of data to be transmitted wherein said segment of data is larger than the largest size of a single data packet allowed for transmission by said transmission medium;
    b) processing said segment to produce an array of linked data blocks wherein each data block is smaller than said largest size wherein said b) is performed by a socket layer of a network communication protocol stack;
    c) adding a transmission control protocol (TCP) header to each data block of said array of linked data blocks, wherein said c) is performed by a TCP layer of the network communication protocol stack;
    d) adding an internet protocol (IP) header to each data block of said array of linked data blocks, wherein said d) is performed by an IP layer of the network communication protocol stack, wherein operations c) and d) collectively serve to generate a separate packet for each data block in the array of linked data blocks, wherein the separate packets for the data blocks are linked to form a packet chain having a packet sequence corresponding to a linkage sequence of the data blocks in the array of linked data blocks; and
    e) wherein said IP layer identifies the packetized data blocks of said array to a network interface card (NIC) for communication over said transmission medium.

18. A method as described in claim 17 further comprising said NIC transmitting each data block of said array over said transmission medium as a data packet one data block at a time.

19. A method as described in claim 18 wherein said e) comprises identifying said packetized data blocks of said array one data block at a time to said NIC.

20. A method as described in claim 18 wherein said e) comprises identifying at one time all of said packetized data blocks of said array to said NIC.

21. A method as described in claim 18 wherein said array comprises a plurality of linked messages wherein each message comprises a plurality of linked data blocks and wherein said e) comprises identifying one message at a time to said NIC.

22. A method as described in claim 18 wherein said a) is performed by an application layer of the network communication protocol stack.

23. A method as described in claim 18 wherein each data block of said array is approximately 1,500 bytes in length.

24. A method as described in claim 18 wherein said data blocks of said array are linked by memory address pointers stored therein.

25. A computer readable storage medium having program instructions stored thereon for processing data to be transmitted on a transmission medium, comprising:
   program instructions for storing in memory a segment of data to be transmitted wherein the segment of data is larger than the largest size of a single data packet allowed for transmission by a transmission medium;
   program instructions for processing said segment to produce an array of linked data blocks wherein each data block is smaller than the largest size;
   program instructions for receiving an identifier of the array and in response thereto for adding a transmission control protocol (TCP) header to each data block of the array of linked data blocks;
   program instructions for receiving the identifier of the array and in response thereto for adding an internet protocol (IP) header to each data block of the array of linked data blocks, wherein adding the TCP and IP headers to each data block serves to generate a separate packet for each data block in the array of linked data blocks, wherein the separate packets for the data blocks are linked to form a packet chain having a packet sequence corresponding to a linkage sequence of the data blocks in the array of linked data blocks; and
   program instructions for identifying the packetized data blocks of the array to a communication subsystem for communication over the transmission medium.

26. A computer readable storage medium as recited in claim 25, wherein the communication subsystem is a network interface card (NIC).

27. A computer readable storage medium as recited in claim 26, wherein the packetized data blocks are identified to the NIC one data block at a time.

28. A computer readable storage medium as recited in claim 27, wherein the NIC accesses and transmits one packetized data block at a time over the transmission medium.

29. A computer readable storage medium as recited in claim 26, wherein all of the packetized data blocks are simultaneously identified to the NIC.

30. A computer readable storage medium as recited in claim 29, wherein the NIC accesses and transmits one packetized data block at a time over the transmission medium.

31. A computer readable storage medium as recited in claim 25, wherein the array comprises a plurality of linked messages wherein each message comprises a plurality of linked data blocks.

32. A computer readable storage medium as recited in claim 25, wherein each data block of the array is approximately 1,500 bytes in length.

33. A computer readable storage medium as recited in claim 25, wherein the data blocks of the array are linked by memory address pointers stored therein.

* * * * *